Feb. 13, 1923.
E. R. CALTHROP
AERIAL CRAFT
Filed May 12, 1922   5 sheets-sheet 2
1,445,293
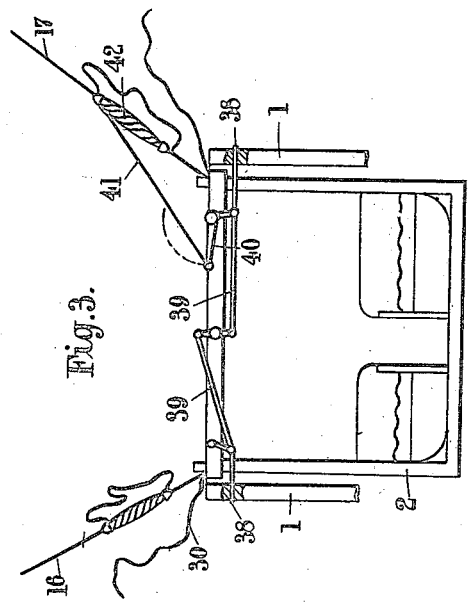
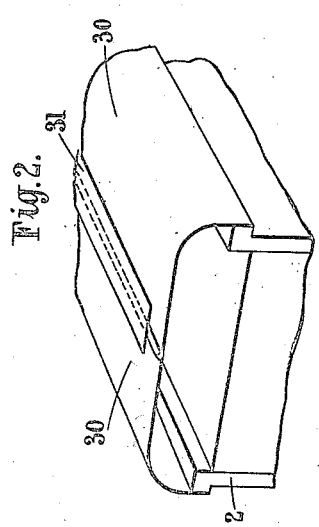
INVENTOR.
E. R. Calthrop
By
Lawrence Langner
Att'y

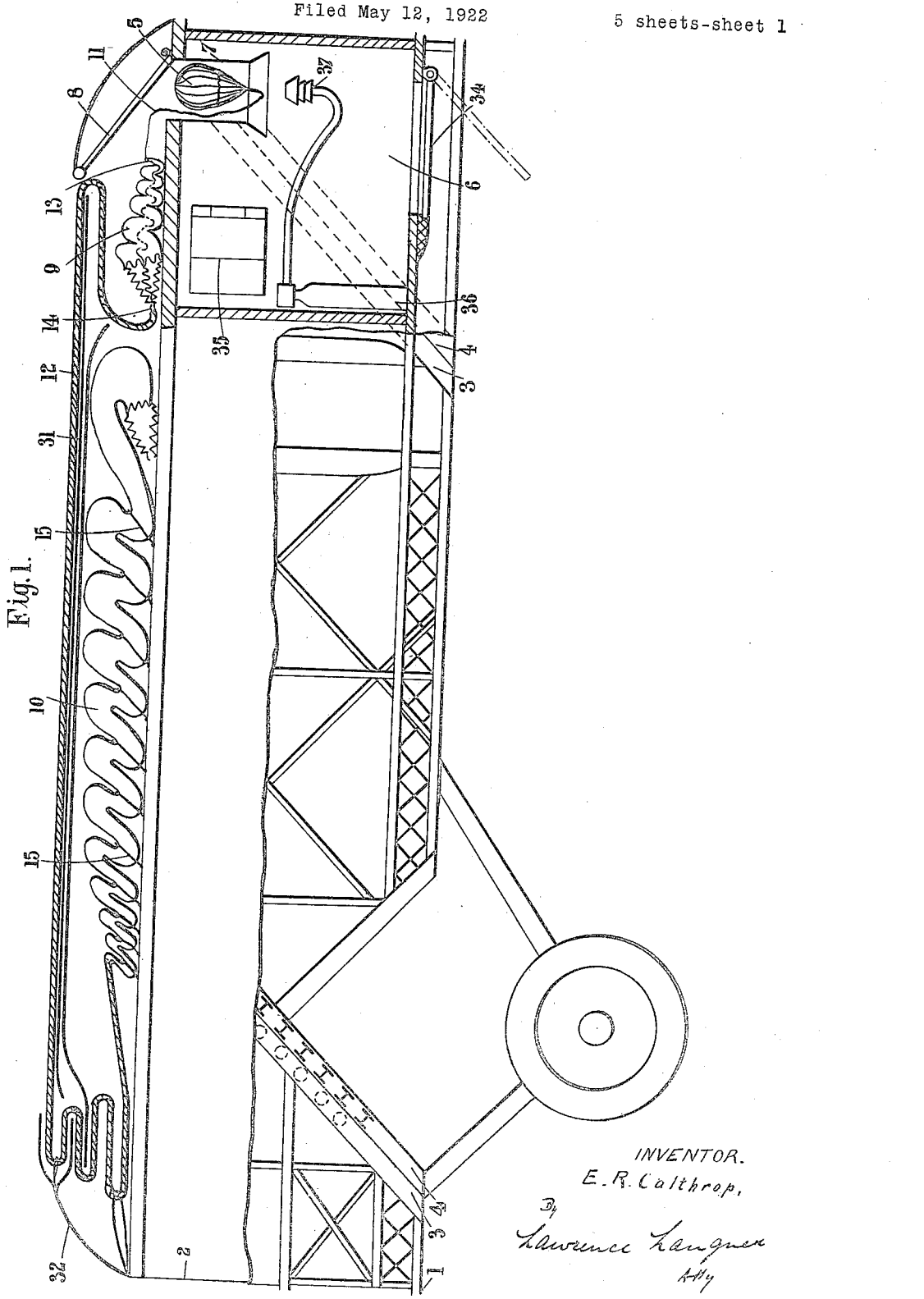

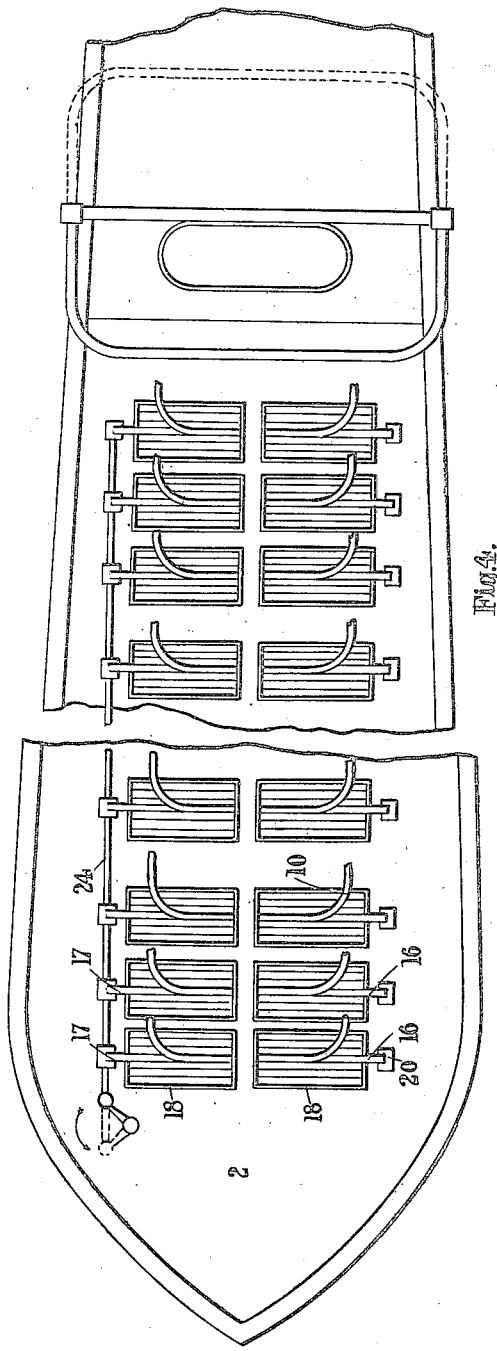
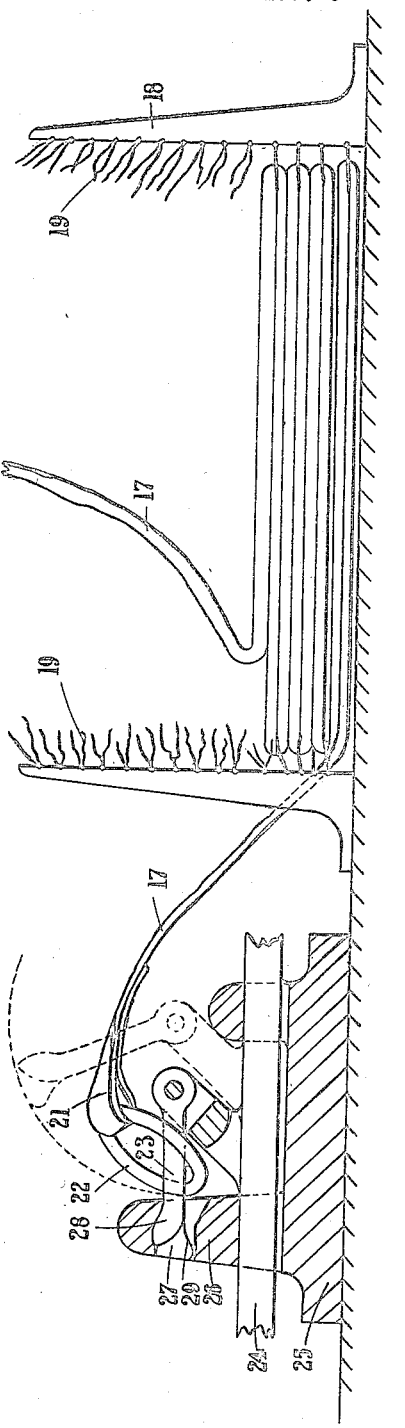

Feb. 13, 1923.

E. R. CALTHROP

AERIAL CRAFT

Filed May 12, 1922

INVENTOR.
E. R. Calthrop
By
Lawrence Langner
Atty

Patented Feb. 13, 1923.

1,445,293

UNITED STATES PATENT OFFICE.

EVERARD RICHARD CALTHROP, OF LONDON, ENGLAND, ASSIGNOR TO E. R. CAL-THROP'S AERIAL PATENTS LIMITED, OF LONDON, ENGLAND, A COMPANY OF THE UNITED KINGDOM OF GREAT BRITAIN.

AERIAL CRAFT.

Application filed May 12, 1922. Serial No. 560,386.

*To all whom it may concern:*

Be it known that I, EVERARD RICHARD CALTHROP, a subject of the King of Great Britain, residing at London, England, have invented new and useful Improvements Relating to Aerial Craft, of which the following is a specification.

This invention has reference to aerial craft and refers more particularly to means whereby the occupants of a machine in flight may be enabled to descend safely to the ground when circumstances render it necessary or advisable.

The use of parachutes for making descents from aerial craft in flight has been so abundantly demonstrated that in case of aeroplanes carrying one or two persons no difficulty is experienced but in the case of larger passenger-carrying machines a more serious problem is presented as in the case of an accident to the machine in mid-air the consequent confusion and perhaps panic is likely to prevent the passengers making individual parachute descents. In the case of an accident to a machine carrying a comparatively large number of passengers a limited time only would be available in which to launch the individual parachutes and before all the passengers could leave the machine disaster would probably overtake them.

Now it is the primary object of the present invention to provide means for rescuing the occupants of an aircraft which will not involve any action or the use of apparatus on their part or in other words to so bring about the ordered and sequential operation of instrumentalities that the occupants of the machine without any volition on their part will be abstracted from the machine and supported during their descent to the ground.

With the aforesaid object in view and such others as may hereinafter appear or are incidental thereto my invention in its broadest aspect may be said to consist in the provision of means whereby a portion of an aerial craft adapted to contain the occupants of the machine may be detached therefrom by a plurality of parachutes in such a manner that said detachable portion together with its occupants will be supported safely in its descent to the ground.

More specifically considered the invention is embodied in an aerial craft having a detachable passenger-carrying receptacle or cabin a plurality of parachutes connected therewith and controlling means the actuation of which causes either the projection of the parachutes above the cabin in ordered sequence and the disconnection of the cabin from the aerial craft in such a manner that the cabin with its occupants will be supported in its descent by said parachutes and means for disconnecting said parachutes from the cabin when the latter reaches the ground.

The invention also comprises details of construction and combination of parts all as hereinafter more particularly referred to and finally pointed out in the claims.

In order that my invention may be readily understood and carried into effect I will now proceed to describe the same fully with reference to the accompanying drawings in which:

Figure 1 is a diagrammatic representation of a portion of the fuselage of an aeroplane or similar aerial craft illustrating the detachable cabin and the general arrangement of the several parachutes whereby when detached from the fuselage it is supported in its descent to the ground.

Figure 2 is a detail view of a portion of Figure 1.

Figure 3 is a detail view hereinafter more particularly referred to.

Figures 4 and 5 illustrate the means employed for connecting the rigging of the main parachute to the cabin.

Figure 6:
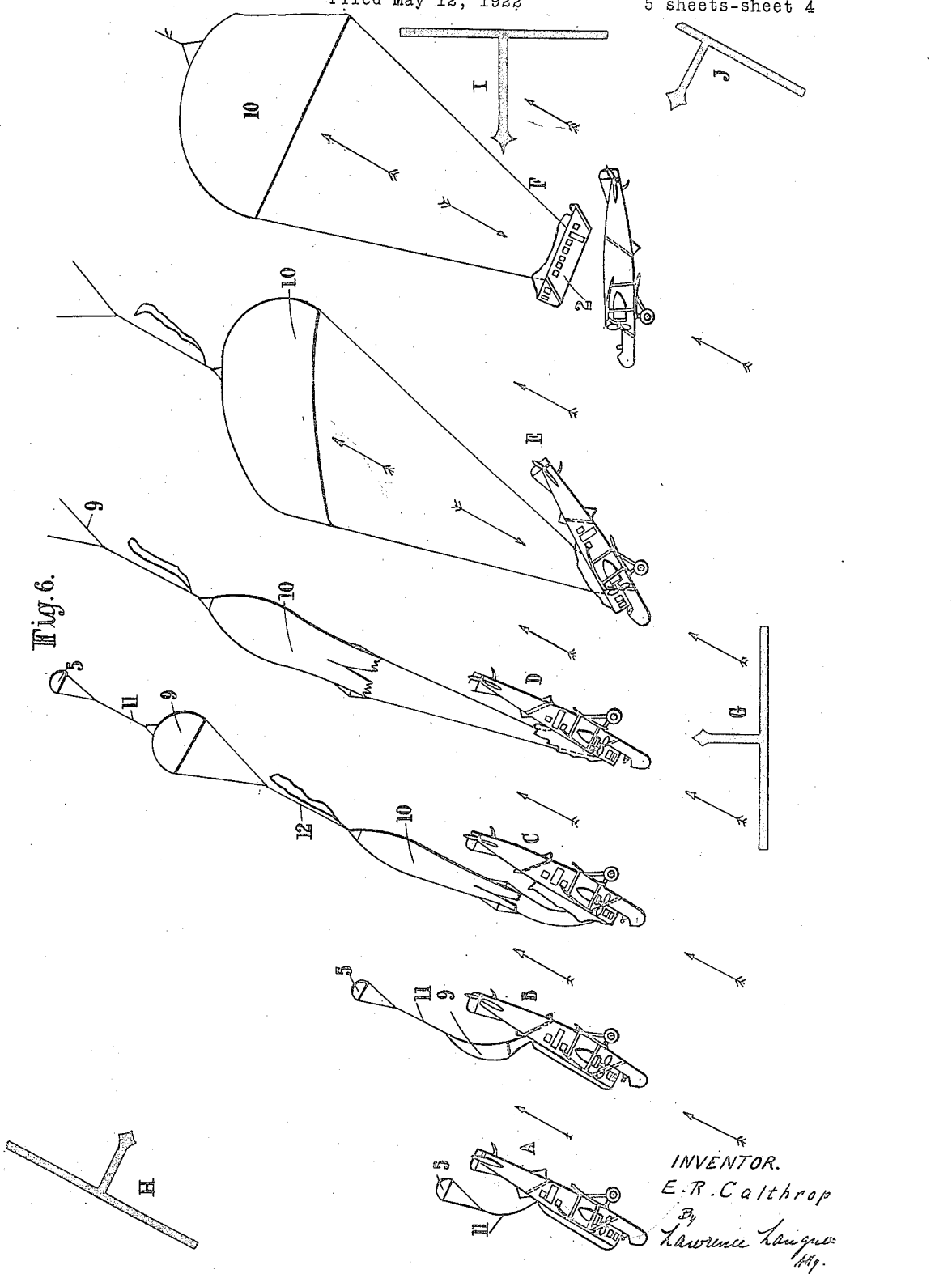

Figure 6 comprises a series of diagrams illustrating the various phases of action of an aeroplane or the like equipped with my invention.

Figure 7:
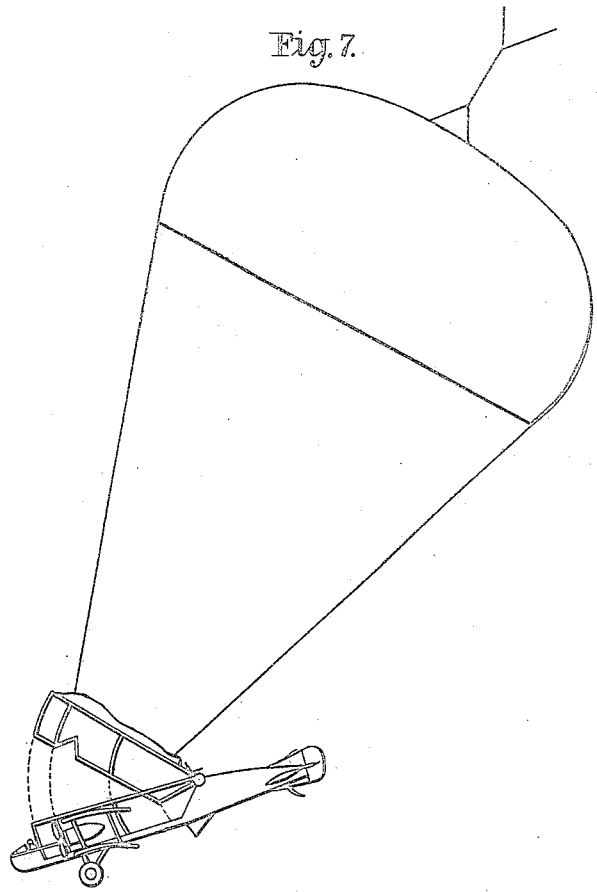

Figure 7 is a diagram hereinafter referred to.

Referring first to Figure 1 the reference numeral 1 indicates a portion of the fuselage of an aeroplane and 2 the passenger cabin as a whole. The cabin 2 is a separate unit of the machine that is to say it is so constructed as to fit into the fuselage structure which is provided with rearwardly directed ramps 3 co-operating with correspondingly arranged ramps 4 on the cabin 2 so that when—as will presently be explained—the cabin is dragged clear of the fuselage friction between cabin and fuselage will be reduced. These ramps may be straight as shown in Figure 1 or they may be curved as may be found desirable in practice.

The cabin 2 is normally locked in its position within the fuselage 1 by locking bolts adapted to be operated either by means of a hand lever under control of the pilot of the machine or otherwise or they may be operated automatically. The manual actuation of said locking bolts may be effected by any well known mechanical arrangement of levers as will be understood without further explanation but in case of the automatic actuation of said locking bolts I prefer to utilize the pull of the expanded parachutes when the full load is exerted upon the rigging of the parachute and in Figure 2 I have illustrated one means whereby this may be effected but a description of the operation of this device will best be deferred until I have described the arrangement and operation of the parachutes whereby the cabin is extracted from the fuselage for it is only after the launching and expansion of said parachutes that the device illustrated in Figure 2 comes into operation.

In the case of large aeroplanes carrying many passengers in an enclosed cabin and where the pilots and mechanics are carried apart from the passengers in the nacelle it is an important feature of the invention that the centre of gravity of the detachable cabin with or without its load of passengers should coincide approximately with the centre of gravity of the machine when the cabin has been removed so that, when, in a nose-dive or any other eventuality such as fire or anticipated collision, the extraction of the cabin in the manner presently to be explained has so depressed the tail of the machine as to raise the nose to a horizontal position the pilot may be able to continue his flight and bring the empty machine safely to ground or alternatively to so check the fall of the machine as to give the pilots and mechanics the better opportunity of leaving it by small parachutes.

In the case of aeroplanes of such design and construction that the removal by parachute of the cabin carrying passengers would destroy the fore and aft balance of the machine by the transition forward of its centre of gravity with the result of a vertical nose-dive being inevitable it is essential that the pilot should himself be carried away in the receptacle or cabin.

I will now proceed to describe the arrangement and operation of the parachutes and while any number which may be found desirable or necessary to support the cabin may be employed I will describe the use of three which for convenience I will term the pilot parachute the intermediate parachute and the main parachute.

Again referring to Figure 1 the pilot parachute 5 is housed in a receptacle or compartment 6 at the rear of the cabin 2 and preferably in a small container indicated by the reference numeral 7 normally closed by a hinged cover or lid 8 adapted to be operated by a lever under the pilot's control or otherwise by any appropriate means.

The intermediate parachute 9 and the main parachute 10 are housed upon the top of the cabin structure 2 the load rope 11 of the pilot parachute 5 being positively secured to the apex of the intermediate parachute 9 the load rope 12 of which is in turn positively attached to the apex of the main parachute 10. The rigging of the three parachutes is preferably constructed of tape and that of the intermediate and main parachutes is preferably arranged in packs having means whereby static and kinetic control is exerted thereon as will be presently explained.

It will be observed from Figure 1 that the load rope 11 of the pilot parachute 5 after being secured to the apex 13 of the intermediate parachute 9 passes through the latter and is again secured to the rigging of said parachute 9 at the point 14 where all the rigging tapes meet the length of the portion of the rope between the points 13 and 14 being equal to the length of the parachute 9 and its rigging when fully extended. By this means the pull of the pilot parachute will be first exerted on the apex of parachute 9 to abstract it and will then be transmitted through the load rope 12 to the apex of the main parachute 10. The parachute 9 is so arranged that its mouth is disposed towards the front of the aircraft and while the body of the main parachute 10 is laid along the cabin top with its apex towards the front thereof the mouth of the parachute is turned towards the front of the aircraft all in such a manner that as the parachutes are abstracted the mouth of each will be in the most favourable position to receive the maximum effect of the air current incidental to the flight of the machine and so bring about the rapid expansion of the parachute bodies.

The various folds of the main parachute 10 are retained in position upon the top of the cabin by breaking pieces 15 all of which are broken successively by the pull of the pilot and intermediate parachutes 5 and 9 thus preventing any possibility of the main parachute being prematurely blown away en masse.

I will now deal with the means which I propose to employ for connecting the rigging of the main parachute 10 to the cabin 2 for it will be apparent that with a parachute of such dimensions as will necessarily have to be employed to support the weight of the cabin and its contents it would not be feasible to lead the individual tapes composing the rigging to a common point as is the case with a man carrying parachute but that on the contrary it is necessary to distribute the load of the cabin as evenly as possible upon the rigging. Furthermore it is necessary that means should be provided whereby when the cabin reaches the ground the parachutes may be released or at least partially released from the cabin so that the wind may be prevented from blowing the parachutes along if still fully expanded or re-expanded after attaining the horizontal position and thus dragging the cabin with them. To these ends therefore I adopt the arrangement illustrated in Figures 4 and 5 of which the first figure illustrates diagrammatically a plan view of the top of the cabin showing the manner in which the rigging of the main parachute is attached to the cabin and the second figure represents in section one of the devices whereby each of the rigging tapes is detachably connected to one longitudinal side of the cabin so that they may be released simultaneously either by a positively operated manual control or automatically when the cabin reaches the ground.

Referring then to Figures 4 and 5 the reference numeral 16 indicates the rigging tapes of the main parachute 10 on one side of the cabin top and 17 the rigging tapes on the opposite side of the cabin top. As previously stated the tapes are arranged in packs and preferably are packed in boxes 18 secured to the cabin 2 and in order to ensure that when the pull of the parachute is exerted upon them they shall issue under continuous tension thereby preventing fouling or entanglement one with the other breaking cords or other rupturable connections 19 (Figure 5) are passed through the loops of the tapes and attached to the boxes 18 so that as the tapes are withdrawn by the pull of the parachute 10 the laps of the tape packs will emerge in ordered sequence as the cords or other rupturable connections 19 snap.

These breaking pieces 19 are of varying breaking strength the lighter breaking pieces being employed to temporarily retain the folds near the top of the boxes 18 and other breaking pieces of varying increasing breaking strengths being used for the laps as they progressively approach the bottom of the boxes 18. By this means shock upon the cabin will be mitigated and the stresses will be rendered more elastic and graduated.

The rigging tapes 16 are positively attached to the cabin top at 20 by any convenient means but the tapes 17 are detachably connected to said cabin so that when the cabin reaches the ground all of said tapes 17 may be released simultaneously thereby depriving the parachute 10 of its capacity to enclose air and consequently of its power to drag the cabin 2. This simultaneous release of the rigging tapes 17 may be effected by the means illustrated in Figure 5. The ends 21 (Figure 5) of the tapes 17 terminate in rings 22 adapted to be retained by a detent 23 pivotally mounted upon a rod 24 (Figures 4 and 5) slidably mounted in guides 25 having an upstanding lug 26 in which an aperture 27 is formed to receive the tapered end 28 of the detent 23. To hold the end 28 of the detent in engagement with the correspondingly shaped aperture 27 a spring 29 may be provided on said detent whereby in conjunction with the taper on the detent release of the rigging tapes is rendered practically impossible whilst the parachute 10 is carrying its load. By operating the rod 24 as soon as the pull of the parachute has ceased and permits it to be operated all the tapes 17 will be released simultaneously.

To further minimize the violence of the shocks and strains exerted upon the cabin and its connections with the rigging of the parachute 10 I may find it desirable to interpose in suitable positions appropriate shock absorbing devices in the rigging tapes.

Suitable weather proof covers are provided to enclose and protect the packed parachutes 9 and 10 when in position upon the roof of the cabin 2.

These covers which are essential to keep everything dry are composed of two flaps 30 (Figure 2) which fold over from the sides of the cabin and meet in the centre where they are hermetically sealed by a stripping piece 31 lightly cemented in position. This stripping piece is attached to the load rope 12 near to the apex of the main parachute 10 so that before the pull comes upon the apex of the main parachute 10 a pull is exerted upon the leading end of the stripping piece 31 so that the latter is stripped off in advance of the exit of the apex of the main parachute 10. Similarly if it is desired to place another weather-proof covering under the exterior flaps this is pulled off by a connection fastened to the load rope of the intermediate parachute about midway between the stripping piece connection and the apex of the main parachute.

The entrance of the load rope of the intermediate parachute at the fore end of the weather-proof flaps is protected from the entrance of wet by a suitable weather flap 32 in the fore end in which a breaking piece 33 is inserted. As the load rope 12 necessarily has to be on the outside of the stripping piece light breaking pieces are arranged along its length in order to prevent displacement.

From the foregoing it will be understood that an aeroplane or the like equipped with my invention comprises a cabin normally secured to the fuselage and having three parachutes attached thereto and that when necessity arises said parachutes are launched sequentially in such a manner that when they are fully expanded the cabin will be dragged clear of the aeroplane and supported during its descent to the ground and that the operation of the several parts to secure this result may be clearly understood I will now refer to the series of diagrams comprised in Figure 6. These diagrams are lettered A to F and the heavy arrows G, H, I and J indicate the aspect at which the diagrams should be viewed to visualize the action of the aeroplane in a nose-dive, flying upside down, on a steep climb, and when flying on a horizontal flight respectively and it should be assumed that the cabin is so designed that its centre of gravity approximately coincides with the centre of gravity of the aeroplane so that when the cabin is detached the aeroplane by the actuation of the parachutes will tend to right itself and proceed upon a more or less level keel.

In the event of the machine getting out of control in a nose-dive for example the pilot or other responsible officer first actuates the lever under his control and which by suitable means such as connecting rods and levers of well known constructions releases the cover 8 (Figure 1) of the container 7 in which is housed the pilot parachute 5. By the same instrumentality the door or flap 34 located at the bottom of the compartment 6 is opened and drops into the position indicated in dotted lines, the flaps 35 (of which there are two one upon each side of the compartment 6) are opened and the compressed air in the cylinder 36 is admitted to the ejector 37. The air current incidental to the flight of the machine enters through the apertures uncovered by the flaps 34 and 35 and augmented by the compressed air issuing from the ejector 37 sufficient pressure is produced within the compartment 6 to eject the pilot parachute 5 through the opening uncovered by the cover 8. As this occurs the parachute 5 will immediately be caught in the air current—the direction of which is indicated by the feathered arrows—(see diagram A) and fully expanded thus exerting its pull through the load rope 11 upon the apex of the intermediate parachute 9 which is thus extracted with its mouth presented to the air current (see diagram B) and rapidly fully expanded. Incidentally the air under pressure issuing through the opening uncovered by the flap 8 assists in extracting and inflating the intermediate parachute and also in keeping the body of the main parachute from contact with the fuselage. The combined pull of the expanded parachutes 5 and 9 is now exerted upon the apex of the main parachute 10 which is in like manner abstracted with its mouth presented to the air current and expanded (see diagram C). The combined pull of the three parachutes is then exerted upon the tapes 16 and 17 of the parachute 10 and the laps of said tapes then pay out in ordered sequence as hereinbefore explained. When the tapes 16 and 17 are extended fully the mechanism illustrated in Figure 3 comes into operation to disconnect the cabin 2 from the fuselage of the machine. As shown in this figure the cabin 2 is detachably connected to the fuselage 1 by bolts 38 adapted to be operated by rods 39 and a bell crank lever 40 which is actuated by a connection 41 between said lever 40 and the rigging tapes 17 so that as all the rigging tapes become taut and the shock absorber 42 is expanded the connection 41 will be operated to turn the bell crank 40 and the cabin 2 will be made free to receive the full effective pull of the three parachutes and the cabin will commence to leave the fuselage sliding smoothly over the ramps 3 and 4. It will be obvious that the cabin should normally be bolted to the fuselage as without this precaution there would be danger if the machine was flying upside down of the cabin falling out without the parachutes being expanded.

Inspection of diagrams E and F will reveal that the action of withdrawal of the cabin from the fuselage tends to depress the tail of the aeroplane and so when the cabin is clear of the machine this latter will be restabilized and able to proceed on an approximately level keel.

The cabin 2 may be provided with horizontally acting parachutes to arrest or minimize the swing of the cabin or main parachute during descent and reduce shock upon landing of the cabin. I may also provide appropriate buffers and shock absorbing devices whereby violent impact of the cabin with the ground will be largely prevented and inflatable floats may also be provided on the cabin so that in the event of this latter falling into water it may be prevented from sinking.

Figure 7 is a diagrammatic view of an aeroplane in which the ramps 3 and 4 of Figure 1 are replaced by radial runways and the cabin 2 is provided with a portion acting as a fulcrum relatively to the fuselage an arrangement which will tend to depress the tail of the aeroplane as the cabin is withdrawn and so restabilize the machine.

Appropriate emergency exits are provided in the cabin to allow of the exit of passengers on landing and these exits may normally be closed by curtains or shutters of the spring roller type adapted to be automatically released when the cabin reaches the ground for which purpose mechanism similar to that referred to in the preceding paragraph may be utilized.

In the case of an airship provided with two or more independent gondolas and instant action is required such as in the case of the gas-bag being fired, electrical or other connections may be provided so that from any one gondola on which the discovery has been made that the gas-bag is itself on fire the other gondolas can be dropped simultaneously. While the gondolas and their parachutes make an instant and speedy descent the gas-bag relieved of so great a load will immediately ascend thus putting a greater distance between itself and the parachutes dropping below thus lessing the risk of their being fired or damaged by a violent explosion of the gas-bag.

While I have described in the foregoing specification the construction and operation of parts I am aware that numerous changes of construction and operation may be made without departing from the spirit and scope of the invention and I therefore do not wish to be understood as limiting myself by the positive terms employed in connection with the description.

While I am aware that it has heretofore been proposed to abstract the pilot's seat together with its occupant from an aerial craft by means of a parachute—which in some cases has been launched by a pilot or auxiliary parachute—and that in the case of a balloon it has been proposed to disconnect the basket or passenger carrying receptacle and support it in its descent to the ground by a parachute—as for instance in the specification of my Letters Patent of prior date hereto No. 127,881—it is to be observed that the present invention is distinguished from these prior proposals by reason of the fact that the expeditious disconnection of a comparatively large and heavy passenger carrying cabin with its contents from an aerial craft and its support during its descent to the ground presents a problem which could not be solved with any of the prior proposals with which I am acquainted. By means of my present invention I am enabled to provide for the extraction and support of a passenger carrying cabin of any size within reasonable limits as the sequential launching of a plurality of parachutes enables me to employ the desired number of supporting elements according to the weight of the load.

Having now particularly described and ascertained the nature of my said invention and in what manner the same is to be performed I declare that what I claim is:—

1. In an aerial craft the combination with the fuselage of a detachable passenger carrying cabin, a plurality of parachutes connected to said cabin, means for sequentially launching said parachutes, means whereby the launching of the parachutes automatically disconnects the cabin from the aerial craft whereby the parachutes will withdraw the cabin from the aerial craft and support it during its descent to the ground, and means for quickly releasing the cabin from the parachutes when it reaches the ground.

2. In an aerial craft the combination with the fuselage of a detachable passenger carrying cabin, a plurality of interconnected parachutes, a plurality of connections between one of said parachutes and said cabin, means for sequentially launching said parachutes, means for detaching said cabin from the aerial craft whereby the parachutes will withdraw the cabin from the aerial craft and support it during its descent to the ground and means for simultaneously releasing all the connections between said cabin and the connected parachute when said cabin reaches the ground.

3. In an aerial craft the combination with the fuselage of a detachable passenger carrying cabin, a plurality of parachutes connected to said cabin, means for sequentially launching said parachutes, means for automatically disconnecting the cabin from the aerial craft when said parachutes are launched whereby the parachutes will withdraw the cabin from the aerial craft and support it during its descent to the ground and means for quickly releasing the cabin from the parachutes when the cabin reaches the ground.

4. In an aerial craft the combination with the fuselage of a detachable passenger carrying cabin, a plurality of interconnected parachutes, a plurality of connections between one of said parachutes and said cabin, means for sequentially launching said parachutes, means for automatically disconnecting the cabin from the aerial craft when said parachutes are launched whereby the parachutes will withdraw the cabin from the aerial craft and support it during its descent to the ground and means for simultaneously releasing all the connections between said cabin and the connected parachute when said cabin reaches the ground.

5. In an aerial craft the combination with the fuselage of a detachable passenger carrying cabin, a plurality of interconnected parachutes, a plurality of connections between one of said parachutes and said cabin, means for sequentially launching said parachutes, means whereby the launching of the parachutes disconnects the cabin from the aerial craft whereby the parachutes will withdraw the cabin from the aerial craft and support it during its descent to the ground, and means for simultaneously releasing the connections between said cabin and the connected parachute when said cabin reaches the ground.

6. In an aerial craft the combination with the fuselage of a detachable passenger carrying cabin having a pilot parachute, an intermediate parachute, and a main parachute operatively connected with each other and with said cabin and normally housed on said cabin means for first ejecting the pilot parachute into the air current incidental to the flight of the aerial craft in such a manner that the pull thereof operates to abstract the intermediate and main parachutes and means whereby the main parachute may be disconnected from said cabin when the latter reaches the ground.

7. In an aerial craft the combination with the fuselage of a detachable passenger carrying cabin having a pilot parachute an intermediate parachute, and a main parachute operatively connected with each other and with said cabin and normally housed on said cabin means for first ejecting the pilot parachute into the air current incidental to the flight of the aerial craft in such a manner that the pull thereof operates to abstract the intermediate and main parachutes means whereby the main parachute may be disconnected from said cabin when the latter reaches the ground and rupturable connections between the rigging of the main parachute and the cabin and between the parachute and the cabin.

8. In an aerial craft the combination with the fuselage of a detachable passenger carrying cabin having a pilot parachute, an intermediate parachute and a main parachute operatively connected with each other and with said cabin and normally housed on said cabin means for first ejecting the pilot parachute into the air current incidental to the flight of the aerial craft in such a manner that the pull thereof operates to abstract the intermediate and main parachutes, means whereby the main parachute may be disconnected from said cabin when the latter reaches the ground, a two part weather-proof cover for enclosing the nested parachutes adapted to be sealed with a stripping piece and connections between said stripping piece and the load rope or ropes of the parachutes for removing said stripping piece as the parachutes are launched.

9. In an aerial craft the combination with the fuselage of a detachable passenger carrying cabin having a pilot parachute, an intermediate parachute and a main parachute operatively connected with each other and with said cabin and normally housed on said cabin means for first ejecting the pilot parachute into the air current incidental to the flight of the aerial craft in such a manner that the pull thereof operates to abstract the intermediate and main parachutes, means whereby the main parachute may be disconnected from said cabin when the latter reaches the ground ramps or runways on the detachable cabin and ramps or runways on the fuselage.

10. In an aerial craft the combination with the fuselage of a detachable passenger carrying cabin having a pilot parachute, an intermediate parachute and a main parachute operatively connected with said cabin and normally housed on said cabin, means for first ejecting the pilot parachute into the air current incidental to the flight of the aerial craft in such a manner that the pull thereof operates to abstract the intermediate and main parachutes, rings carried by the rigging of the main parachute, pivoted detents on the cabin engaged by said rings and a reciprocating rod adapted to release the aforesaid detents.

EVERARD RICHARD CALTHROP.